(No Model.)
H. BARNES.
FRICTION CLUTCH.
No. 350,798. Patented Oct. 12, 1886.
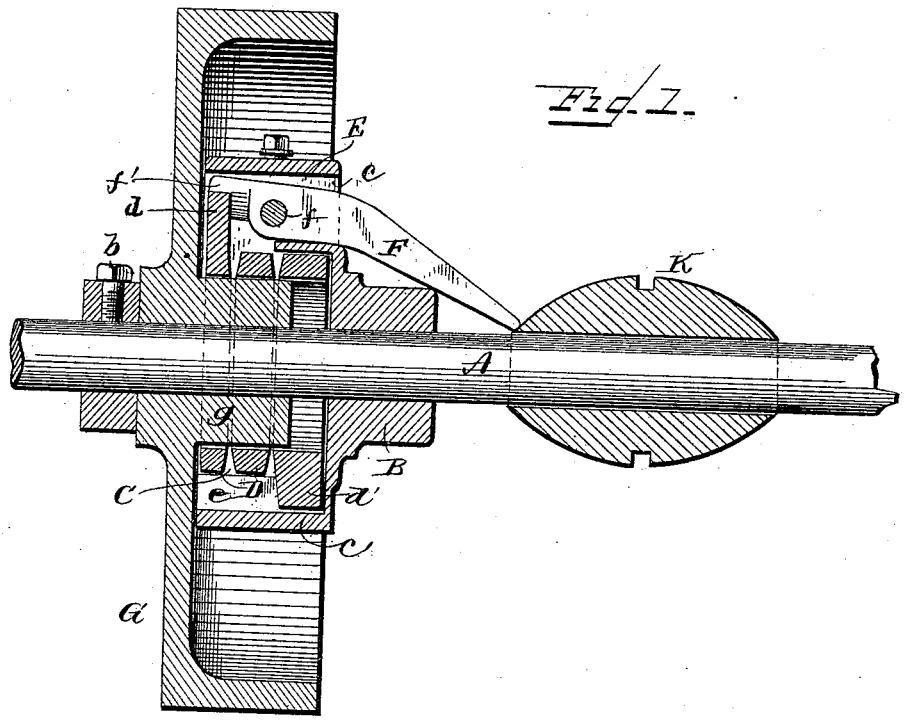
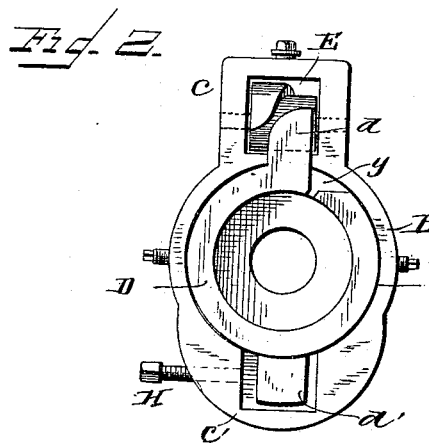
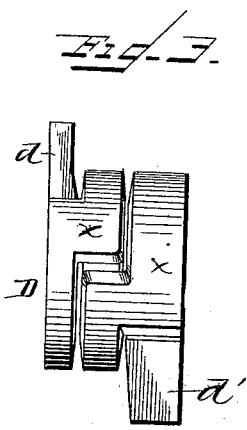
WITNESSES
F. L. Durand
Geo. F. Downing
INVENTOR
Henry Barnes
By H. A. Seymour
Attorney

UNITED STATES PATENT OFFICE.

HENRY BARNES, OF HYDE PARK, MASSACHUSETTS.

FRICTION-CLUTCH.

SPECIFICATION forming part of Letters Patent No. 350,793, dated October 12, 1886.

Application filed May 28, 1886. Serial No. 203,550. (No model.)

*To all whom it may concern:*

Be it known that I, HENRY BARNES, of Hyde Park, in the county of Norfolk and State of Massachusetts, have invented certain new and useful Improvements in Friction-Clutches; and I do hereby declare the following to be a full, clear, and exact description of the invention, such as will enable others skilled in the art to which it appertains to make and use the same.

My invention relates to an improvement in friction-clutches.

In Letters Patent No. 202,400, granted to me on April 16, 1878, a clutch was shown and described in which a coiled band or spring inclosed in a false hub provided with bell-crank levers and carried by the shaft was brought into frictional contact with the hub of a loose pulley by means of sliding wedges engaging the ends of the spring and operated by the short ends of the levers, whereby the pulley-wheel was clutched and rotated with the shaft.

The object of my present invention is to provide a clutch in which the pressure for closing a split band or spring on a hub may be applied at or near the ends of the band and in a direction parallel with the path in which the periphery of the clutched hub travels or the path in which the driving-power immediately connected therewith travels.

A further object is to provide a split band or spring in which the sections thereof shall be of different strengths, whereby the part where the greatest strain is exerted may be re-enforced.

A further object is to provide a clutch in which the tension of the split band or spring may be more conveniently and effectually regulated and the clutch manufactured at a reduced cost.

With these ends in view my invention consists in a split band or spring consisting of a series of connected split rings having lugs formed at or near its ends adapted to enter recesses in a false hub and be engaged by the regulating and operating devices.

My invention further consists in certain features of construction and combinations of parts, as will be hereinafter described, and pointed out in the claims.

In the accompanying drawings, Figure 1 is a longitudinal sectional view of the clutch attached to a shaft in position for use. Fig. 2 is an end view of the split band or spring and false hub, the pulley being removed; and Fig. 3 is a detached view of the split band or spring.

A represents a shaft, to which a false hub, B, is adapted to be secured by set-screws or by any other well-known or approved means. One end of the false hub B is provided with an enlarged cylindrical chamber, C, within which fits the split band or spring D. On one side of the enlarged portion of the false hub is formed a lug, $c$, through which is formed an opening, E, to receive the operating-lever F. The opening E communicates with the chamber C at its end toward the pulley G, and is adapted to receive the rounded or beveled faced lug $d$, formed on or near the end of the split band or spring nearest the pulley. The opposite side of the enlarged portion of the false hub is also provided with a bulging or thickened mass of material, $c'$, in which is formed a recess, $e$, running longitudinally with the shaft or hub and communicating with the chamber C throughout its entire length. The purpose of the recess $e$ is to receive a second lug, $d'$, formed on or near the opposite end of the split band or spring. The pulley G is adapted to run loosely on the shaft A, and is provided with a hub, $g$, adapted to fit loosely within the split band or spring D. The joint between the hub of the pulley and the split band or spring should be sufficiently loose, when the spring is relaxed, to admit of the free rotary movement of the split band or spring about the hub or of the hub within the spring.

The split band or spring D consists, preferably, of a series of bands or rings, $x$, each connected with its adjacent band or ring at one end, the adjacent faces of the rings or bands lying in planes transverse to the axis of the split band. The number of sections may be two or more, three being a convenient number, and they are formed gradually increasing in width to increase their strength from the one nearest the loose pulley toward the opposite end of the false hub. Each ring or band section is opened, as shown at $y$, the connection between its end and the end of its adjacent ring or band section being at the side. Thus the pressure on the lugs at the ends of the split band or spring will tend to close the ends of each ring or band section, and will not produce the twisting strain which is exerted on the spiral form.

The operating-lever F is fulcrumed on a pin, $f$, extending through the sides of the skeleton lug $c$, and its operating arm or head $f'$ is beveled or rounded on its side and adapted to engage the rounded or beveled faced lug $d$ on the split band or spring when forced toward the shaft. The handle or operating-arm of the lever inclines toward the shaft, and its end rests in contact with or near the shaft. A double or single cone, K, is loosely mounted on the shaft, and by means of a suitable shifting-fork is caused to engage the handle end of the operating-lever and force it away from the shaft, which motion causes the beveled or wedge-shaped end $f'$ to engage the lug $d$ and tend to close the split band or spring. A set screw or bolt, H, is adapted to work in a threaded perforation in the side of the bulging portion $c'$, and to impinge against the side of the lug $d'$, and thereby partially close the split band or spring, and hence cause the action of the operating-lever to effect a contact between the split band or spring and the hub of the pulley at an earlier stage of its stroke, or enable it with a limited stroke to effect a stronger frictional contact. The lateral play of the lug $d'$ in the recess $e$ is intended to be sufficient to take up the wear during the ordinary life of the spiral band or spring, and to set it at the desired tension at any time.

The casting or forging of the lugs $d$ $d'$ integral with the split band or spring is a matter of economy in the manufacture, and, taken in connection with the recesses cast in the false hub, affords a material saving in the cost and at the same time increases the scope and efficiency of the clutch.

It is evident that slight changes might be resorted to in the form and arrangement of the several parts described without departing from the spirit and scope of my invention—as, for instance, using levers on opposite sides of split rings, or using a double-threaded spiral with two adjusting screws and levers; or a single spiral band may be provided with lugs, one on each end, as shown, in the split band or spring sections; hence I do not wish to limit myself strictly to the construction herein set forth; but, Having fully described my invention, what I claim as new, and desire to secure by Letters Patent, is—

1. In a friction-clutch, a split band or spring adapted to extend two or more times around a hub or shaft, and having a pair of operating-lugs formed integral therewith, substantially as set forth.

2. In a friction clutch, the combination, with a false hub adapted to receive the hub of a loose pulley, and provided with recesses communicating with the hub-receiving chamber, of a split band or spring provided with a pair of lugs adapted to enter the said recesses and be locked therein, substantially as set forth.

3. In a friction-clutch, the combination, with a false hub provided with a hub-receiving chamber, and having a clutch-operating lever pivotally secured in a skeleton lug formed thereon, of a split band or spring having a lug at or near one end adapted to engage the said lever, and a lug at or near the opposite end adapted to enter a recess in the false hub, substantially as set forth.

4. In a friction-clutch, the combination, with a false hub provided with a hub-receiving chamber and a recess communicating with the chamber, adapted to receive a lug on the split band or spring, of a set screw or bolt extending through the wall of the recess and adapted to adjust the lug within the recess, and hence the tension of the spring, substantially as set forth.

5. The combination, with the false hub and means for securing it to the shaft, and the loose pulley having a hub adapted to enter the chamber formed in the false hub, of the split band or spring having a beveled or rounded faced lug formed at or near one end, and an operating-lug formed at or near the opposite end, and an operating-lever adapted to engage the beveled-faced lug, the whole constructed and arranged substantially as set forth.

6. In a friction-clutch, a spring-band consisting, essentially, of a series of connected split rings provided with operating-lugs and adapted to grip and release a pulley, substantially as set forth.

7. In a friction-clutch, a spring-band consisting, essentially, of a series of connected split rings gradually increasing in strength, and provided with operating-lugs at their free ends, the said spring-band adapted to grip and release a pulley, substantially as set forth.

In testimony whereof I have signed this specification in the presence of two subscribing witnesses.

HENRY BARNES.

Witnesses:
CHARLES E. JENNEY,
CHARLES F. JENNEY.